G. A. SCHEEFFER.
INDUCTION METER.
APPLICATION FILED AUG. 10, 1911.
1,158,565.
Patented Nov. 2, 1915.
4 SHEETS—SHEET 1.
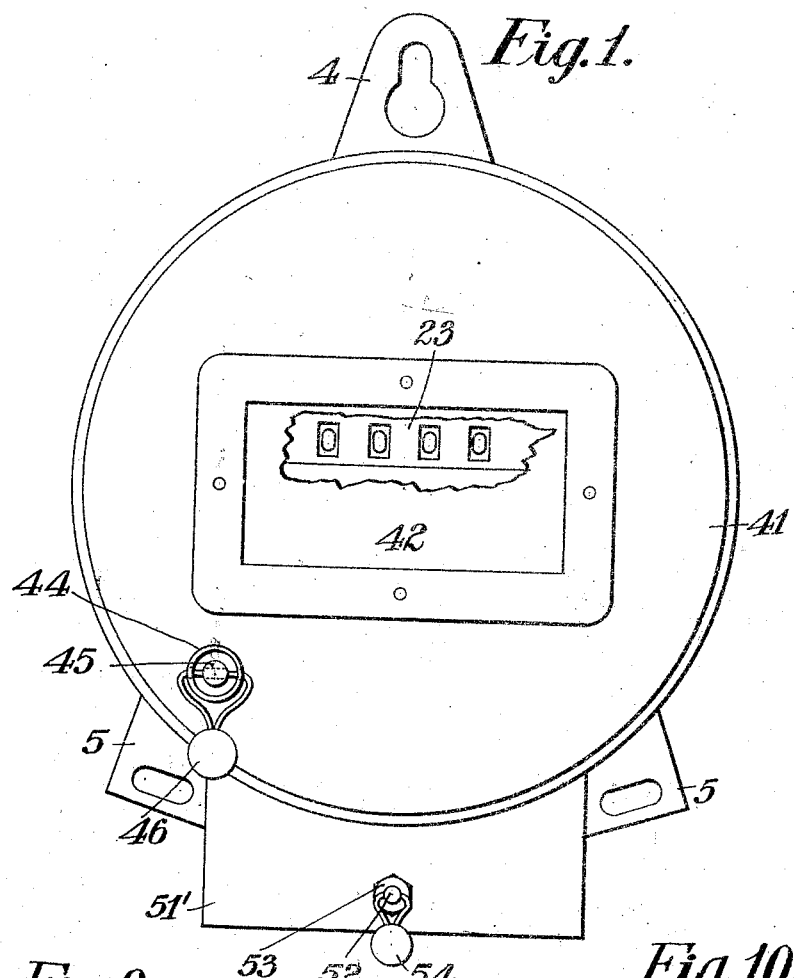
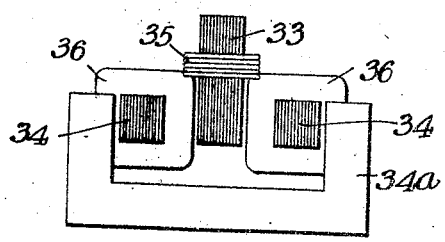
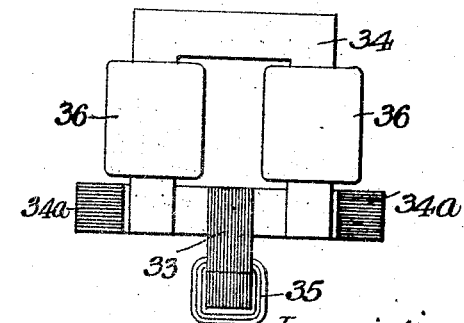
Witnesses:
Leonard W. Novander
Albin C. Ahlberg
Inventor
Gustave A. Scheeffer
By Brown Williams
Attorneys

G. A. SCHEEFFER.
INDUCTION METER.
APPLICATION FILED AUG. 10, 1911.

1,158,565.

Patented Nov. 2, 1915.
4 SHEETS—SHEET 2.

Witnesses:
Leonard W. Novander
Albin C. Ahlberg

Inventor
Gustave A. Scheeffer
By Brown Williams
Attorneys

G. A. SCHEEFFER.
INDUCTION METER.
APPLICATION FILED AUG. 10, 1911.

1,158,565.

Patented Nov. 2, 1915.
4 SHEETS—SHEET 3.

Witnesses:
Leonard W. Novander
Albin C. Ahlberg

Inventor,
Gustave A. Scheeffer
By Brown Williams
Attorneys

G. A. SCHEEFFER.
INDUCTION METER.
APPLICATION FILED AUG. 10, 1911.

1,158,565.

Patented Nov. 2, 1915.
4 SHEETS—SHEET 4.

Witnesses:
Leonard W. Novander
Albin G. Ahlberg

Inventor
Gustave A. Scheeffer
By Brown Williams
Attorneys

UNITED STATES PATENT OFFICE.

GUSTAVE A. SCHEEFFER, OF INDIANAPOLIS, INDIANA.

INDUCTION-METER.

1,158,565.  Specification of Letters Patent.  Patented Nov. 2, 1915.

Application filed August 10, 1911. Serial No. 643,297.

*To all whom it may concern:*

Be it known that I, GUSTAVE A. SCHEEFFER, a citizen of the United States, residing at Indianapolis, in the county of Marion and State of Indiana, have invented a certain new and useful Improvement in Induction-Meters, of which the following is a full, clear, concise, and exact description, reference being had to the accompanying drawings, forming a part of this specification.

My invention relates to an improved form of construction of induction meters for measuring the quantity of electrical energy flowing through a given circuit, and is characterized by an arrangement of parts such that the meter may be adjusted and repaired with the greatest facility and that the various parts employed may be constructed and assembled with a minimum amount of expense.

Figure 2:
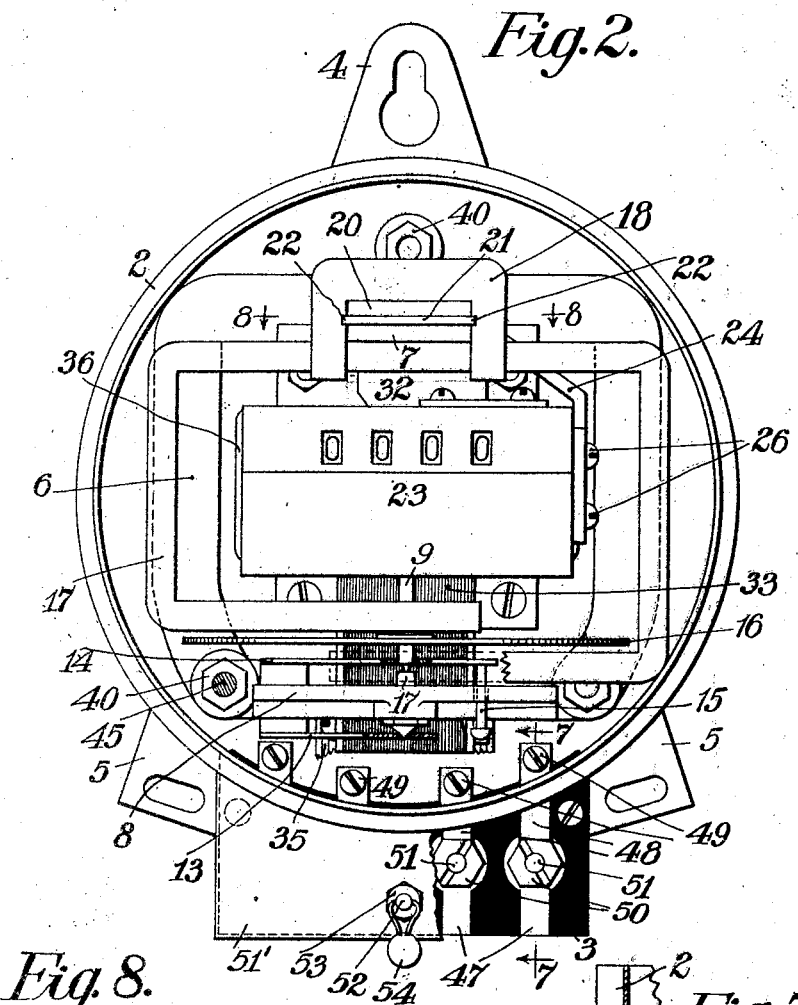
Figure 8:
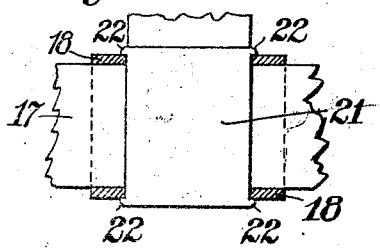
Figure 7:
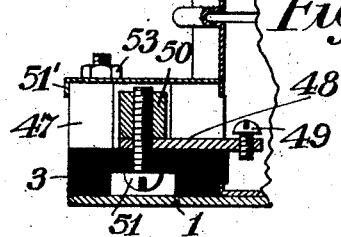
Figure 3:
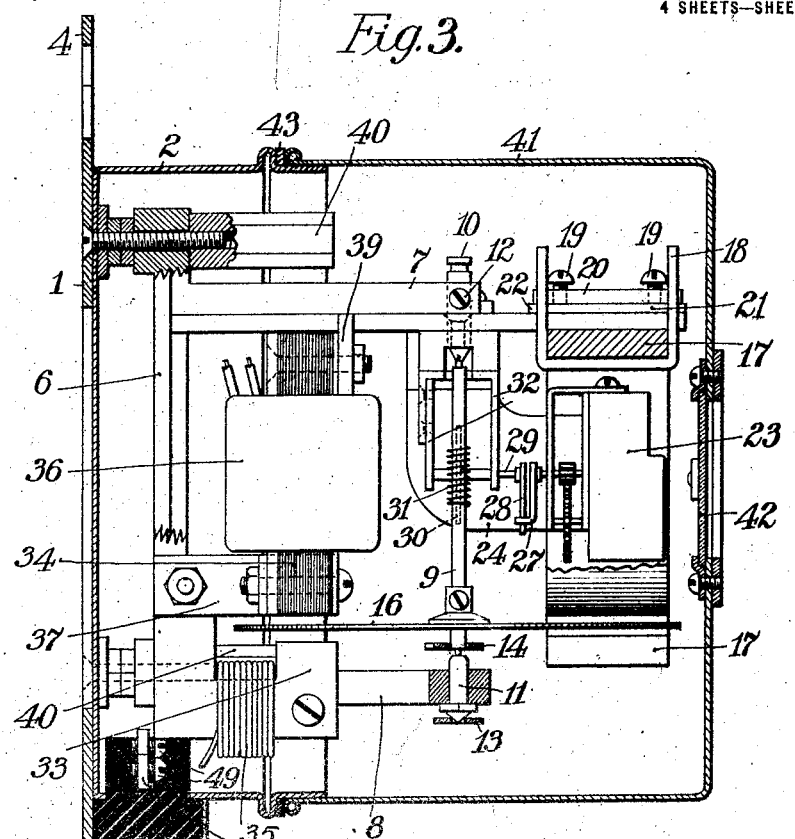
Figure 6:
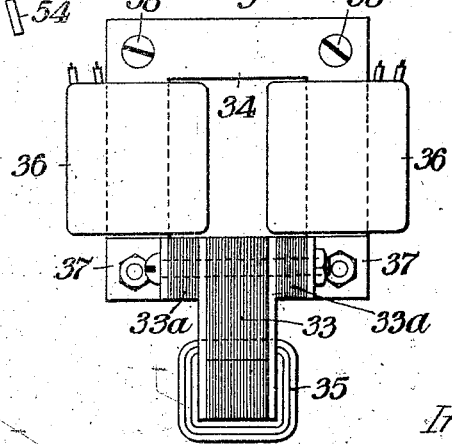
Figure 4:
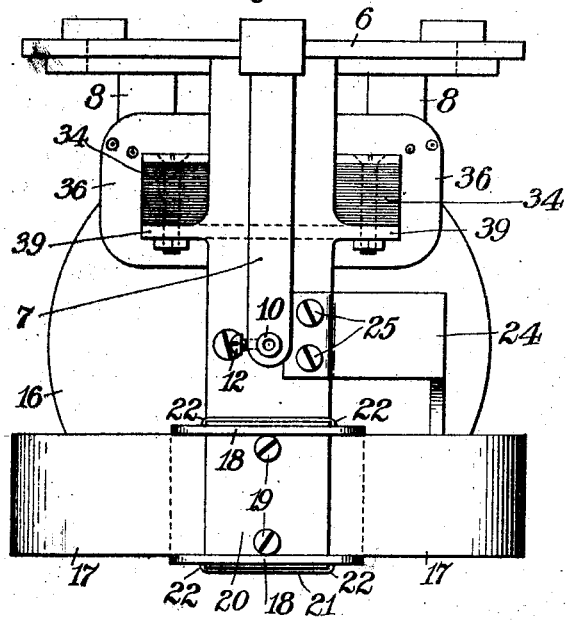
Figure 5:
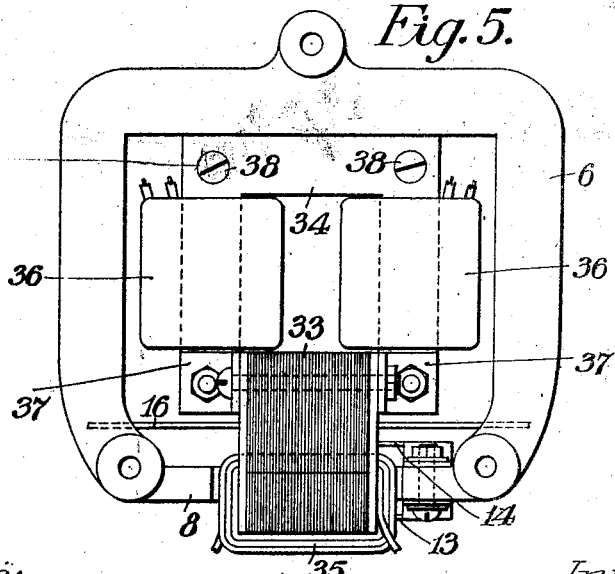

The several drawings illustrating my invention are as follows:

Figure 1 is a front view of my meter complete with the cover in place. Fig. 2 is a view similar to Fig. 1 with the cover of the meter proper removed, and also with a portion of the cover of the terminal box removed to show the construction of the terminals. Fig. 3 is a side view of the internal mechanism of the meter, partially in section, to show the relative arrangement of the parts. In this figure the casing is shown in section. Fig. 4 is a plan view of the driving and braking mechanism employed in the meter, together with the bracket employed to support the same. Fig. 5 is a back view of the parts shown in Fig. 4. Fig. 6 shows, in a view similar to Fig. 5, a modified arrangement of the electromagnetic mechanism used to drive the meter disk. Fig. 7 is a detail sectional view of the terminal construction and is taken along the line 7—7 in Fig. 2. Fig. 8 is a detail view taken along the line 8—8 in Fig. 2, and shows a portion of the clamping means employed to secure the braking magnet to its supporting bracket. Figs. 9 and 10 are diagrammatic bottom and back views, respectively, of a modified magnetic driving system.

Similar numerals refer to similar parts throughout the several views.

As shown in Figs. 2 and 3, the back plate 1 of the meter is conformed to support the sheet metal casing 2 and the terminal block 3, the upper end of the back plate 1, which may preferably be of sheet metal, being extended at 4 to support the meter and being provided, as shown in Fig. 2, with ears 5 to receive additional supporting screws. The back plate 1 supports within the casing 2 a bracket or framework 6, preferably of cast metal, provided with arms 7 and 8 to support the shaft 9 by means of bearings 10 and 11. The bearing 10 is held in place in the arm 7 by means of a set screw 12 and is conformed to engage the upper end of the shaft 9, which is of reduced cross section so as to make the friction of the operation of the shaft a minimum. The lower end of the shaft 9 is pointed and rests upon a jewel carried by the bearing, as is usual in meter constructions. The bearing 11 is removable from the arm 8 and is normally held in place by a spring 13. A spring 14 is normally disposed around the lower end of the shaft 9, being provided with a clearance opening so that it is not in engagement with such shaft, and is provided with a pin 15 extending through the arm 8 and headed at its lower end. The springs 13 and 14 are secured at their left-hand ends, as shown in Fig. 2, to the arm 8. The spring 14 thus serves to prevent accidental displacement of the shaft 9 from the bearing 11. The shaft 9 has secured thereto a disk 16, which travels at the front of the meter between the poles of the permanent magnet 17, one pole extending below the disk, while the upper pole is above the disk, the poles of the magnet extending in opposite directions and being substantially parallel with each other and with the disk, thus forming a damping magnet having a single air gap, instead of a double air gap as has been proposed heretofore in the art. The magnet 17 is surrounded by a stamped clip 18 which extends over the forward end of the arm 7 and is secured thereto by means of binding screws 19 extending through the plate 20, which fits in the openings in the clip 18 and is prevented from displacement from the clip by means of such set screws. A plate 21 is disposed between the plate 20 and the arm 7, being held in place by ears 22, as indicated in Fig. 8, such plate being provided to engage the lower ends of the screws 19 to prevent marring of the top of the arm 7. Thus a means is provided by which the magnet 17 may be moved with the clip 18 and the clamping plates longitudinally of the arm 7 to move the magnet toward or away from the shaft 9 and thus adjust the magnet 17 for full load conditions to secure the right rate of operation of the integrating mechanism. The clip 18 also provides the means for adjusting the magnet 17 transversely of the arm 7 so that the pole ends are properly disposed relatively to the disk.

The magnet 17 is of sufficient size so that the integrating mechanism 23 is supported within the magnet by means of a bracket 24 screwed to the arm 7 at 25, as shown in Fig. 4, such arm being secured to the integrating mechanism at 26, as shown in Fig. 2. The integrating mechanism has secured to its driving shaft a crank 27 engaged by an arm 28 carried by a shaft 29, which has secured thereto a worm wheel 30 driven by the worm 31 carried by the shaft 9. The shaft 29 is supported from the arm 7 by bearing arms 32.

The disk 16 at its rear edge is disposed between the poles of the series magnet 33 and immediately below the poles of the pressure magnet 34. The core of the series magnet 33 is made of hollow rectangular stampings slotted through one side to receive the disk 16, and the core of the magnet 34 is composed of U-shaped rectangular stampings between the lower ends of which the stampings forming the magnet 33 are disposed at right angles to the stampings forming the magnet 34, so that the upper pole of the series magnet is disposed between the poles of the pressure magnet, as a result of which the flux through the pressure magnet is caused to traverse to a great extent the upper pole of the series magnet in a direction at right angles to the plane of the stampings forming the core of the said series magnet. The minute air gaps between the stampings of the core of the series magnet cause a sufficient reluctance in the magnetic path of the pressure magnet so that the magnetic flux between the poles of the pressure magnet is caused to pass to a certain extent downward and through the disk 16, and this action is changed by the effect of the series magnet when energized by the series coil 35 disposed upon the lower limb of the core of the said magnet, as a result of which the effective magnetic flux through the disk 16 which causes rotation of said disk is varied proportionally to the current flow through the coil 35 and also proportionally to the current flow through the pressure coils 36, mounted upon the legs of the core of the pressure magnet 34. The cores of the magnets 33 and 34 are bolted together as indicated and secured together by means of plates 37, the entire structure being held in place in the meter by bolts 38 extending through the flange 39 formed upon the arm 7.

The supporting frame 6 is of rectangular construction, as indicated in Fig. 5, so that if it is desired to remove the magnetic system from the framework, the framework and parts supported thereby are first removed from the casing 2 by unscrewing the nuts 40 and then by unscrewing the bolts 38, the entire magnetic system may be withdrawn from the back of the frame 6 without disturbing any of the other mechanism. Again, if for any reason it is desired to remove the shaft 9, this may be done by unscrewing the set screw 12 and withdrawing the upper bearing 10 and then pulling down the pin 15 by means of its headed lower end so as to release the lower end of the shaft 9, for which condition the shaft 9 and disk 16 may be moved toward the observer, as seen in Fig. 3, without disturbing the driving magnets or the braking magnet. It is to be observed also that if for any reason the braking magnet must be removed from the arm 7, this can be done without disturbing either the disk 16 or the integrating mechanism. If for any reason it is desired to remove the integrating mechanism, this may be done by unscrewing the screws 25, which will not disturb in any way the adjustment of any of the magnets or the meter shaft 9 and parts connected therewith. Thus, any part may be removed for repair very readily and the meter construction as a whole need not be taken apart to get at any desired portion.

The sheet metal cover 41 is provided for the meter, which has a sight opening in its front wall protected by a plate of glass 42 so that the reading of the integrating mechanism 23 may be observed. A gasket 43 is employed between the cover 41 and the casing 2 to make a tight joint between the two parts, such cover being held in place by a nut 44 engaging a post 45 extending outward through the cover from one of the nuts 40, as shown in Fig. 2. The nut 44 may be sealed in place relatively to the post 45 by means of a seal 46, as is customary in the art, if desired.

In some constructions it may be desirable to use fewer stampings in the core 33 of the series magnet than required to fill the space between the poles of the core 34 of the pressure magnet, and in this case, as shown in Fig. 6, the remaining space between the poles of the pressure magnet is preferably filled by extra pieces of stampings 33ª so as to afford a comparatively good magnetic path between the poles of the pressure magnet.

The terminal block 3 secured to the lower side of the casing 2 has formed therein a plurality of slots 47 in which terminal bars 48 are disposed, the inner ends of such bars being provided with binding screws 49, while the outer ends are engaged by nuts 50 disposed in enlarged recesses made to receive them in the terminal block 3. The nuts 50 engage the outer ends of the bolts 51 extending through the bars 48, and besides holding the bars 48 in place, the nuts serve to engage the external conductors connecting with the circuit, the energy of which it is desired to measure. The screws 49 are designed to connect with the internal circuits of the meter. A cover 51' is provided for the terminal block, which is held in place by a bolt 52 and a nut 53, which may be sealed as indicated at 54 in the usual manner.

With the modified magnetic system shown in Figs. 9 and 10, the major portion of the flux from the shunt core 34 crosses the comparatively small air gaps and completes its circuit through the stampings 34ª provided for that purpose, a comparatively small portion of the flux passing through the disk. As a result, with this arrangement the series core and shunt core are entirely independent of each other and the flux from one core has no part of its path common with the path of the flux from the other core. I therefore provide a construction in which a first iron core is energized by a winding having a large number of turns which constitutes a shunt winding for the meter, the core of such winding forming almost a complete magnetic circuit which produces a high inductance, and in conjunction with this shunt core I employ a series winding of a few turns of large wire on an iron core, all of the flux from which is directed through the moving element of the meter independently of the flux from the shunt core, the series flux being in a different plane from that through the shunt core and traversing no part of the shunt core.

From the above description it will appear that by my invention the series and pressure magnets are so arranged that they properly co-act to cause rotation of the armature disk 16 proportionally to the energy flowing in the circuit measured and that the arrangement described is operative for variations either in pressure or current flow in such circuit. It will also appear that the meter construction is simple to make, since most of the parts may be formed of sheet metal. Only one braking magnet is used and this consists but of a single piece of metal, and all of the parts are so disposed that the meter is of extremely small size, and further that any of the parts may be removed from the meter structure without disturbing the adjustment of the other parts.

While I have described my invention in connection with the particular arrangements shown in the drawings, I do not limit myself to this construction, but may employ equivalent arrangements without departing from the spirit of my invention.

What I claim is:

1. In an electricity meter, the combination of a rotatable shaft, a rotating element on said shaft, a framework, upper and lower bearing studs for the shaft supported by the framework, the lower bearing stud projecting above the framework, a spring guard member carried by the frame adjacent said rotating element and having an opening through which said shaft passes, said opening being larger than the diameter of the lower bearing stud, and means for drawing the guard member down over said stud until it clears the lower end of the shaft.

2. In an electricity meter, the combination of a rotatable shaft, a framework, upper and lower bearings for the shaft supported by the framework, a spring guard member carried by the frame and encircling the lower end of the shaft to prevent displacement thereof, said guard member extending beyond said shaft, and a headed pin extending from the outer end of the guard member to withdraw it from the lower end of the shaft.

3. In an electricity meter, the combination of a rotatable shaft, a disk carried by the shaft, a pressure magnet having a core composed of laminations disposed entirely on one side of the disk, and a series magnet having a core composed of laminations disposed in planes substantially at right angles to the plane of laminations of the pressure magnet, the poles of the series magnet being located one between the poles of the pressure magnet and the other upon the opposite side of the disk, said series core having laminations lying between the poles of said pressure core and clamped thereto.

4. In an induction meter, the combination of a rotatable shaft, a disk carried by the shaft, a pressure magnet having its poles disposed adjacent the disk, a series magnet, and stampings extending between the poles of the pressure magnet, and being spaced therefrom to provide gaps in the magnetic material for causing part of the flux to be diverted through the disk, said series magnet having one of its pole pieces disposed between said poles of the pressure magnet.

5. In an induction meter, the combination of a pressure magnet comprising a practically-closed iron magnetic circuit having relatively small air-gaps, a moving element in proximity to the poles of the magnet, through which said element only part of the magnetic flux passes, an iron core, a series winding on the core, said core embracing the moving element and having one pole disposed directly between the poles of the pressure magnet, but spaced from such poles to direct the magnetic flux entirely through the moving element independently of the flux from the pressure magnet.

6. In an induction meter, the combination of a pressure magnet comprising an iron core, pressure windings upon the core, said core having a comparatively small air gap between its poles, a rotary element in proximity to the poles of said core and disposed adjacent the pressure magnet so that part of its flux passes through said element, a series winding, and an iron core for said series winding having a portion on each side of said rotary element, said core being disposed partially between the poles of said pressure magnet but magnetically independent thereof.

7. In an electric meter, the combination of a moving element, a shunt core having a part of its flux directed through the moving element, windings for said shunt core, a series core having one of its pole-pieces disposed between the pole-pieces of the shunt core and having all of its flux directed through the moving element, a series winding on the series core, and clamping means to secure the pole-pieces of said cores together, the magnetic paths of said cores being independent of each other.

In witness whereof, I hereunto subscribe my name, this 4th day of August, A. D. 1911.

GUSTAVE A. SCHEEFFER.

Witnesses:
A. G. BEARD,
C. H. McCARTY.